Patented Aug. 9, 1932

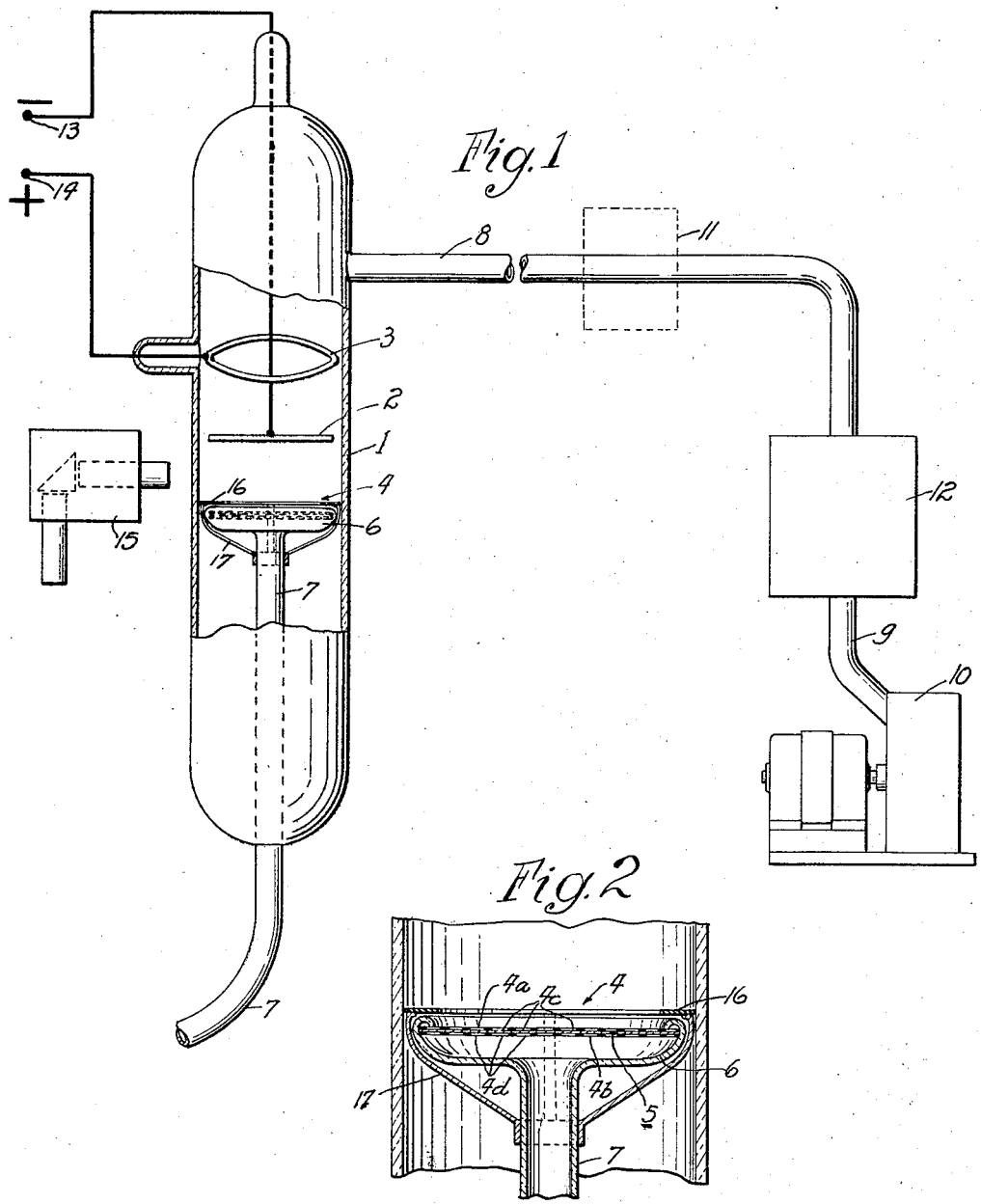

1,871,226

UNITED STATES PATENT OFFICE

LJUBOMIR W. SKALA, OF CICERO, ILLINOIS, ASSIGNOR TO SKALA RESEARCH LABORATORIES, INC., OF CICERO, ILLINOIS, A CORPORATION OF ILLINOIS

METHOD OF SEPARATING AND PURIFYING GASES

Application filed July 5, 1929. Serial No. 376,087.

The invention relates to a method of and means for purifying certain gases, especially hydrogen, oxygen, helium and other rare and light gases.

It is well known that to carry out certain processes and experiments in chemistry, physics, and other branches of the natural sciences, the success of such processes depends on the purity of the gas employed. As an example reference is made to the process of producing the metal carbonyls, or the cathode sputtering process. In these two processes the use of pure hydrogen gas is imperative.

It is therefore an object of the invention to provide a new method for purifying gas whereby the purification process is carried out with a high degree of efficiency.

A further object aims at providing a new method of purification, enabling spectroscopic analysis of the purification process.

A still further object aims at providing a diffuser for the originally produced gas and imparting heat to the diffuser to thereby accelerate diffusion and at the same time impart a glowing light to the gas emanating therefrom so as to enable spectral analysis of the gas.

With these and other equally important objects in view which will become apparent from a perusal of the invention, the latter comprises the steps of a novel method and the means for carrying out the same, as described in the following specification, particularly pointed out in the claim forming a part thereof, and illustrated in the accompanying drawing, in which Fig. 1 is a more or less diagrammatic view of the apparatus for carrying out my new method, and Fig. 2 is a detail view of an anti-cathode.

The theory on which my invention is predicated is based on the well known physical phenomenon that certain gases diffuse through metals and glass, especially quartz, at high temperatures. If we select a metal which possesses the catalyzing characteristics such as for instance palladium, then we can expect the highest efficiency in the purification process.

The glass tube or bulb 1 is of the well known type of cathode rays tube with the metallic aluminum or platinum cathode 2 and the anode 3 which according to well established theories and practice may be placed under certain vacuum condition in any position.

The electrodes may have the form of a plate, ring or wire. In addition an anti-cathode 4 is employed shown in detail in Fig. 2.

The anti-cathode comprises two metal plates $4a$ and $4b$ preferably out of platinum, but any other metal with a high melting point which may be sealed with glass directly or indirectly may be used. The plates are perforated with a number of holes $4c$, $4d$, or in other words, the metal disks $4a$, $4b$ are metallic screens composed of metal of a high melting point, and these plates constitute holding frames of a palladium disk 5, which is a very thin palladium foil and is interposed between the plates $4a$, $4b$.

The holding plates $4a$, $4b$, with the interposed palladium foil 5 are so arranged that the apertures $4c$, $4d$ are in vertical registry and are then secured in a glass holder 6 formed as a funnel at the upper end of a tube 7.

A gas generating device or gas tank (not shown) is connected to the purifying device by the tube 7. The tube 1 is connected to the apparatus 12 utilizing purified gas by means of an outlet tube 8 and thence a tube 9 leads to a vacuum pump 10. The cathode 2 is then connected with the negative pole 13 of a direct current high voltage source and the anode is connected with the positive pole 14.

The operation of the device is as follows:

The vacuum pump will produce a vacuum in the apparatus 12 and also a vacuum in the tube 1. Depending on the degree of vacuum produced in the tube 1, the applied high potential current will produce an electrical discharge in the tube 1, which discharge will result in a heat and light effect. This discharge is known as a silent discharge.

The diagram of Fig. 1 shows that the purified gas is pumped through the apparatus 12 by means of the vacuum pump 10 and the pressure in the apparatus 12 is obviously lower than the atmospheric pressure.

When it is necessary to use in the apparatus purified gas of a pressure higher than atmospheric pressure, the arrangement may be modified by using a vacuum compressor pump 11 placed between the gas purifying tube 1 and the apparatus 12, as shown in dotted lines, and the vacuum pump 10 is then omitted.

The electrical discharge in the tube is mainly dependent according to the well established physical laws:

1. On the degree of vacuum in the tube 1.
2. On the electric potential applied to the electrodes 2 and 3, and
3. On the kind of gas introduced in the tube 1.

I prefer to place the cathode 2 and the anti-cathode 4 practically as close as possible, but it is essential that the cathode dark space reaches the screen disks 4a, 4b, as well as the interposed palladium disk 5 of the anti-cathode 4. The practice shows that this distance is about 10 mm. For this distance the suitable potential is about 1200 V. and the pressure 0.1 mm. of mercury column. Obviously any other potential and pressure may be used.

The electric discharge from the cathode 2 will result in a high temperature of the screen disks 4a, 4b and especially of the thin palladium disk 5.

The vacuum pump 10 or the vacuum compressor device 11 is working and producing a low pressure in the tube 1 resulting in a relative high pressure in the tube 7 of the anti-cathode 4.

At a certain temperature of the palladium foil 5 the gas will start to diffuse into the tube 1 which is collected by the pump 10 or the vacuum compressor device 11.

It is unnecessary to explain here the catalytic action of palladium which will in this case result in the highest degree of purifying efficiency, for all the gas must pass through the palladium disk 5, and not only a part of it as is the case today with known catalyzing agents (palladium, platinum black or asbestos).

In order to determine the degree of purity of the gas issued from the tube 1 a spectroscopical method is resorted to.

The discharge from the cathode 1 results in a glow of the gas emanating from the anti-cathode 4.

A spectroscope 15 arranged adjacent to the tube 1 in juxtaposition to the space between the cathode 1 and the anti-cathode 4 permits the most perfect analysis of the degree of purity of the gas and thus continuously apprizes the observer whether or not the gas issued from the anti-cathode possesses that degree of purity necessary for successful carrying out of the experiment or process to be conducted in the apparatus 12.

In the event oxygen is to be purified the palladium disk 5 is replaced by a nickel disk and for helium a thin quartz plate is used.

For the purpose of protecting the holder 6 against the intense heat developed between the cathode and the anti-cathode a mica shield in the form of a ring 16 is placed immediately above the holder and supported by any suitable or convenient means, such as by arm 17 secured to the tube 7. The width of the ring is so dimensioned that the central aperture is large enough to preclude interference with the operation of the disk 5.

The described method and the means for carrying out the same may be varied within the purview of the invention.

I, therefore, do not wish to limit myself to the details of arrangement nor to the sequence of steps in carrying out the method, but include all changes, variations and modifications constituting departures within the scope of the invention as defined in the appended claim.

I claim:

A continuous method of gas purification, which comprises the steps of passing the gases to be purified through a palladium diffusing diaphragm located between anti-cathode plates in a cathode ray tube subjected to continuous evacuation, subjecting said diaphragm to electronic bombardment to thereby raise the temperature of said diaphragm to a point to enhance the diffusion of the gases, and continuously withdrawing the gases from said tube.

In witness whereof I affix my signature.

LJUBOMIR W. SKALA.